(12) United States Patent
Sastry et al.

(10) Patent No.: US 10,707,477 B2
(45) Date of Patent: Jul. 7, 2020

(54) HIGH ENERGY DENSITY MULTILAYER BATTERY CELL WITH THERMALLY PROCESSED COMPONENTS AND METHOD FOR MAKING SAME

(71) Applicant: Dyson Technology Limited, Wiltshire (GB)

(72) Inventors: Ann Marie Sastry, Ann Arbor, MI (US); Chia-Wei Wang, Ypsilanti, MI (US); Yen-Hung Chen, Ann Arbor, MI (US); Xiangchun Zhang, Ann Arbor, MI (US); HyonCheol Kim, Ann Arbor, MI (US); Myoungdo Chung, Ann Arbor, MI (US)

(73) Assignee: Dyson Technology Limited, Malmesbury, Wiltshire (GB)

( * ) Notice: Subject to any disclaimer, the term of this patent is extended or adjusted under 35 U.S.C. 154(b) by 76 days.

(21) Appl. No.: 15/705,425

(22) Filed: Sep. 15, 2017

(65) Prior Publication Data
US 2019/0088923 A1   Mar. 21, 2019

(51) Int. Cl.
*H01M 10/04* (2006.01)
*H01M 4/04* (2006.01)
(Continued)

(52) U.S. Cl.
CPC ....... *H01M 4/0421* (2013.01); *H01M 4/0428* (2013.01); *H01M 4/1391* (2013.01); *H01M 6/40* (2013.01); *H01M 10/04* (2013.01); *H01M 10/0562* (2013.01); *H01M 10/0585* (2013.01); *H01M 4/04* (2013.01)

(58) Field of Classification Search
None
See application file for complete search history.

(56) References Cited

U.S. PATENT DOCUMENTS 7,945,344 B2   5/2011   Wang et al.
8,930,008 B2   1/2015   Sastry et al.
(Continued)

OTHER PUBLICATIONS

International Search Report and Written Opinion dated Jan. 14, 2019, directed to International Application No. PCT/GB2018/052545; 11 pages.

*Primary Examiner* — Haixia Zhang
(74) *Attorney, Agent, or Firm* — Morrison & Foerster LLP (57) ABSTRACT

A method of producing a monolithically integrated high energy density solid-state battery device. The method can include positioning a substrate and depositing one or more stacked monolithically integrated high energy density solid-state electrochemical cells in series or in parallel configurations sequentially or individually. Each of these cells can have a first barrier layer, a cathode current collector deposited overlying the first barrier layer, a cathode overlying the electrically conductive layer, an anode, an anode current collector deposited overlying the solid state layer of negative electrode material, and a second barrier layer. The method can also include rapidly heating the one or more stacked cells to a target temperature for at least 60 minutes, and connecting and terminating the one or more stacked monolithically integrated high energy density solid-state electrochemical cells electrically in series or in parallel, to from a monolithically integrated high energy density solid-state battery device.

8 Claims, 7 Drawing Sheets

(51) Int. Cl.
*H01M 4/1391* (2010.01)
*H01M 10/0562* (2010.01)
*H01M 10/0585* (2010.01)
*H01M 6/40* (2006.01)

(56) References Cited

U.S. PATENT DOCUMENTS

| | | |
|---|---|---|
| 9,368,772 B1 | 6/2016 | Chen et al. |
| 9,627,717 B1 | 4/2017 | Langlois et al. |
| 2009/0307896 A1 | 12/2009 | Snyder et al. |
| 2012/0040233 A1 | 2/2012 | Kim et al. |
| 2012/0058377 A1 | 3/2012 | Sastry et al. |
| 2014/0106216 A1* | 4/2014 | Liang .................... H01M 4/131 |
| | | 429/211 |

* cited by examiner

CCC = Cathode Current Collector
CA = Cathode
EL = Electrolyte
AN = Anode
ACC = Anode Current Collector
PML = Polymer Multilayer (230)

FIG. 2C

CCC = Cathode Current Collector
CA = Cathode
EL = Electrolyte
AN = Anode
ACC = Anode Current Collector
PML = Polymer Multilayer

HIGH ENERGY DENSITY MULTILAYER BATTERY CELL WITH THERMALLY PROCESSED COMPONENTS AND METHOD FOR MAKING SAME

FIELD OF THE INVENTION

The present invention relates to techniques for manufacturing solid state electrochemical devices. More particularly, the present invention provides high energy density multilayer battery cell with thermally processed components.

BACKGROUND OF THE INVENTION

Batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

In solid state thin film batteries, those knowledgeable in the field have attempted to build multi-layer, or stacked solid state batteries, but have been limited to only a few stacked cells due to manufacturing problems. This is evidenced by the fact that to date, only miniature solid state batteries have been commercialized for use on credit cards or RFID tag. Those skilled in the art have been unable to manufacture thin film solid-state batteries useful in replacing conventional technology, particularly those batteries for extended use in consumer electronics or in automobiles.

As applications continue to require greater power and efficiency from energy sources such as these batteries, techniques for improving solid-state thin film battery devices continue to be highly desired.

SUMMARY OF THE INVENTION

According to the present invention, a method related to manufacture of electrochemical cells is provided. More particularly, the present invention provides a method of manufacturing a solid state thin film battery device. Merely by way of example, the invention has been described with the use of lithium based cells, but it is recognized that other materials such as zinc, silver, copper, cobalt, iron, manganese, magnesium and nickel could be designed in the same or like fashion.

The design of a solid state battery cell that can be produced at scale has been limited by the absence of computational design tools and the high capital expenditures required to arrive near an optimized design through a trial-and-error process.

The inventors have completed a computational design toolset that utilizes physics-based codes and optimization algorithms to arrive at a set of optimized designs for solid-state batteries that are designed specifically for use in a number of applications. An example of such tool has been described in U.S. Pat. No. 7,945,344 issued May 17, 2011, and titled COMPUTATIONAL METHOD FOR DESIGN AND MANUFACTURE OF ELECTROCHEMICAL SYSTEMS, commonly assigned, and hereby incorporated by reference herein. The inventors further used a novel set of plant optimization calculations which included, among other parameters, the number of unit operations and their processing rates, to enable highly profitable production and return on investment. An example of such tool has been described in U.S. Ser. No. 13/359,374 filed May 24, 2012, and titled METHODOLOGY FOR DESIGN OF A MANUFACTURING FACILITY FOR FABRICATION OF SOLID STATE HYBRID THIN FILM ENERGY STORAGE AND CONVERSION DEVICES, commonly assigned, and hereby incorporated by reference herein. Without these tools it would be difficult to calculate the optimal materials and layer thicknesses for the substrate, the cathode current collector, the cathode, the solid state electrolyte, the anode, and the anode current collector. It would also have been difficult to calculate the process rates required to produce battery cells profitably. This is the only design work of its kind that has been done computationally and verified experimentally, and an optimal set of designs has been generated after years of work and evaluation of literally millions of possible solid-state battery designs.

The results of the invention are a solid-state battery that has energy density above 300 Wh/L. Although this has been achieved using some battery systems that are designed with liquid or gel electrolytes, no solid-state batteries with ceramic electrolytes have come close to achieving this level of energy density. Furthermore, the ceramic electrolytes and the design that is employed eliminates the occurrence of lithium dendrites and other undesirable side reactions that occurs between the liquid or gel electrolyte and the battery materials in conventional wound lithium-ion batteries. Additionally, the solid ceramic electrolyte that is utilized in this invention also eliminates the occurrence of internal short circuits that are a major failure mechanism in lithium-ion battery cells that utilize a polymer separator. In an embodiment, a method of producing a monolithically integrated high energy density solid-state battery device includes forming one or more stacked monolithically integrated high energy density solid-state electrochemical cells sequentially or individually on a substrate, each of the high energy density solid-state electrochemical cells comprising: a first barrier layer, a cathode current collector formed over the first barrier layer, a cathode layer comprising an amorphous or crystalline charge carrier intercalated metal-1, metal-2, and metal-3 oxide or phosphate compound formed over the cathode current collector, a solid state anode layer configured for electrochemical insertion or ions plating during a charge process and a discharge process, an anode current collector formed over the solid state anode layer, and a second barrier layer configured to prevent oxidation of the negative electrode material; annealing the one or more stacked monolithically integrated high energy density solid-state electrochemical cells to a target temperature of greater than 600° C. for at least 60 minutes; and connecting the one or more stacked monolithically integrated high energy density solid-state electrochemical cells electrically in series or in parallel, wherein the one or more stacked monolithically integrated high energy density solid-state electrochemical cells are terminated using one of laser ablation, selective etching, or mechanical masking to form a monolithically integrated high energy density solid-state battery device.

In an embodiment, the present invention provides a method of producing a monolithically integrated high energy density solid-state battery device comprised of multilayered of smaller units, namely the cells, in parallel or in series configuration. The multilayered stack of cells are in discharged state, namely, the charge carrier are bounded with cathode (positive) electrode in each galvanic cell. For example, lithium ion is the charge carrier in Li (-ion) battery device where lithium is intercalated in metal oxide in cathode as the cell under discharged state. The method includes evaporating charge carrier metal, and/or charge carrier oxide compound from one evaporation source, and evaporating metal-1, metal-2, and metal-3 precursors from another evaporation source or from three or more different evaporation sources, wherein the relative amounts of charge carrier metal or/and charge carrier compound, metal-1, metal-2 and metal-3 are controlled by the evaporation speeds and additional oxidation sources including but not limited to background oxygen, ion beam sources, and plasma sources to yield desired stoichiometry of the resulting oxide of charge carrier bounded metal-1, metal-2, and metal-3 compound layers. Merely by way of example, the lithium ion is the charge carrier within lithium battery, the metal-1, metal-2, and metal-3 can be V, Ni, Co, Mn and Al. Then the oxide compound form in discharge state of lithium (-ion) battery has the stoichiometry as $Li_xNi_yCo_zMn_{1-y-z}O_2$ where x is at least 1 (one), y and z are value less than 1 (one) and summation of y and z are also less than 1 (one). For example, $Li_{1.01}Ni_{0.34}Co_{0.33}Mn_{0.33}O_2$, and $Li_{1.01}Ni_{0.65}Co_{0.3}Al_{0.05}O_2$ are two of the candidates. The evaporation method for depositing cell components includes thermal evaporation, phase-change liquid feeder assisted thermal evaporation, e-beam vapor deposition, radio frequency magnetron sputtering, direct current magnetron sputtering, physical vapor deposition (PVD), chemical vapor deposition, low pressure chemical vapor deposition (LP-CVD), atomic layer deposition (ALD), direct laser writing (DLW), sputtering, microwave plasma enhanced chemical vapor deposition (MPECVD), pulsed laser deposition (PLD), nanoimprint, ion implantation, laser ablation, spray deposition, spray pyrolysis, spray coating and plasma spraying. After the deposition of the stacked cells or single layer of cell, the solid-state battery device or subunit can be rapidly heating to a target temperature for at least 60 minutes for burning out or oxidizing certain layer to serve as detaching or smoothing layer between stacked cells or layers. The cathode material can be deposited using a vapor transport deposition technique, and the rate of delivery of the cathode material into an evaporation source can be related to the temperature of the substrate. An improved deposition rate can be achieved when the vapor temperature within the chamber is monitored and controls the rate of material delivered to the evaporation source. The size of the source and the source temperature can provide an indication of how much cathode material can be evaporated for deposition. However, it has been found that the rate of deposition is linked to the vapor temperature of the chamber and the temperature of the substrate.

In an embodiment, the source of charge carrier for charge carrier intercalated compound of metal-1, metal-2, and metal-3 oxide or phosphate can be pre-bounded with compounds of either oxide, peroxide, superoxide, acetate, carbonate, carbide, amid, azide, beryllide, borate, hydride, hodroxide, hypochlorite, iodide, phosphate, fluoride, hexafluorophosphate, hypochlorite, metaborate, molybdate, niobate, nitrate, nitride, nitrite, orotate, perchlorate, stearate, succinate, sulfate, sulfide, sulfite, tantalite, tetrachloroaluminate, tetrafluoroborate, tetrakis (pentafluorophenyl) borate, tetramethylpiperidine, titanate, triborate, and triethylborohydridesup, etc. Merely by way of example, if the charge carrier is lithium ion for lithium battery, the possible charge carrier pre-bounded compounds could be lithium oxide, lithium peroxide, lithium superoxide, lithium acetate, lithium carbonate, lithium carbide, lithium citrate, lithium aluminate, lithium amide, lithium azide, lithium beryllide, lithium borate, lithium hydride, lithium hydroxide, lithium imide, lithium cobalt oxide, lithium diisopropylamide, lithium fluoride, lithium hexafluorophosphate, lithium hypochlorite, lithium iodide, lithium copper phosphate, lithium aluminum phosphate, lithium metaborate, lithium molybdate, lithium niobate, lithium nitrate, lithium nitride, lithium nitrite, lithium orotate, lithium perchlorate, lithium stearate, lithium succinate, lithium sulfate, lithium sulfide, lithium sulfite, lithium tantalite, lithium tetrachloroaluminate, lithium tetrafluoroborate, lithium tetrakis(pentafluorophenyl)borate, lithium tetramethylpiperidine, lithium titanate, lithium triborate, lithium triethylborohydride, and lithium tungstate, for illustration purpose.

In an embodiment, the number of evaporation sources for depositing charge carrier intercalated compound of metal-1, metal-2, and metal-3 oxide or phosphate can be one or multiple depending on the compatibility of melting temperature of precursors of metal-1, metal-2, metal-3. The precursors of metal-1, metal-2 and metal-3 could be compounds of either oxide or phosphate of metal-1, metal-2, and metal-3, or pure elements of metal-1, metal-2 and metal-3. Also, metal-1, metal-2, and metal-3 can be chosen from groups 7, 9, 10 and 13 of periodic table. Merely by way of example, lithium ion is the charge carrier in $Li_{1.01}Ni_{0.34}Co_{0.33}Mn_{0.33}O_2$ and $Li_{1.01}Ni_{0.65}Co_{0.3}Al_{0.05}O_2$, Ni, Co, Mn, and Al are the metal elements in oxide compounds. In order to form $Li_{1.01}Ni_{0.34}Co_{0.33}Mn_{0.33}O_2$ and $Li_{1.01}Ni_{0.65}Co_{0.3}Al_{0.05}O_2$, precursors Al, Co, and Ni can be evaporated from the same source because the temperature for elements Al, Co, and Ni to have vapor pressure of $10^{-4}$ torrs is 1010, 1200 and 1262° C., but element Mn needs to be in different evaporation source because the temperature at $10^{-4}$ torrs vapor pressure is 647° C. The oxygen will be provided through background gas and reacted to the film by ion gun plasma. Similarly, the $Al_2O_3$ and NiO can be evaporated from the same evaporation source, because their temperature to have vapor pressure of $10^{-4}$ torrs is 1550 and 1470° C., respectively. Therefore, it is possible to mix $Al_2O_3$ and NiO together. $Li_2O$, $Mn_3O_4$ and CoO can be in another three different sources.

According to an embodiment of the present invention, these cells are combined in series and in parallel to form a pack, which are configured by termination methods including but not limited to laser ablation, selective etching, and mechanical masking. This integrated pack is regulated by charge and discharge control circuits that are programmed with algorithms to monitor state of charge, battery lifetime, and battery health.

This invention may be incorporated in a hybrid vehicle drive train, including full hybrid, mild hybrid, and plug-in hybrids. This invention may also be utilized with different drive train structures, including parallel hybrids, series hybrids, power-split, and series-parallel hybrids.

Although the above invention has been applied in a vehicle, the above can also be applied to any mobile computing device including, but not limited to smartphones, tablet computers, mobile computers, video game players, MP3 music players, voice recorders, motion detectors. Lighting systems that include a battery, LED or other organic light source, and solar panels may also be applied. Furthermore, aerospace and military applications such as starter motors, auxiliary power systems, satellite power sources, micro-sensor devices, and power sources for unmanned aerial vehicles may be applied.

The potential benefits of solid-state batteries with ceramic separators have been discussed for over a decade, but to date few have truly commercialized this product. One challenge that plagued the commercialization of this product is the development of product design parameters with high levels of performance. Another challenge that has not been previously overcome is the development of a roll-to-roll production process that is required to make larger format-sized (greater than $1/10^{th}$ amp-hour) solid state batteries and winding them and packaging them in a format that can power products that require greater than a micro-amp of electrical current.

In an embodiment, the present invention provides a method of manufacturing a monolithically integrated high energy density solid-state battery device includes extra steps, other than necessary steps of depositing electrode materials, which include steps to crystallize the active material layer such as cathode and anode in-situ or post-deposition, to deposit detaching/smoothing/bounding layer between two electrode material layers, or to carbonize detaching/smoothing/bounding layer between two electrode material layers. Some of the solid-state battery device requires the cathode/anode layer to have crystalline structure to achieve high energy/capacity. Therefore, it is necessary to crystallize the cathode/anode electrode. There are two approaches inducing crystalline to cathode/anode electrode layer. A first approach induces crystalline to the cathode/anode electrode film by providing heat as the deposition of the same electrode layer progress. A second approach induces crystalline to the cathode or anode electrode by providing heat to whole device after deposition process. Further, the connection of electrochemical component layers determines the charge and discharge capability, and cycle life. In some cases, it is necessary to provide bounding or smoothing layer before depositing the next electrode material layer so that the material properties of such layer can improve the connection of two electrode layers. For some case, it is necessary to provide layer material between electrode materials served as detaching layer so that it is easier to split the device into two or more for packaging purpose.

In an embodiment, the present invention provides two approaches of crystallizing electrochemically active layers. The first approach comprises annealing charge carrier electrochemical active compound(s) or the whole solid-state battery device. The annealing steps of this kind include positioning the charge carrier electrochemical active compound or the whole solid-state battery device in a chamber, removing atmospheric gases from the chamber, providing process gas to the chamber; submerging charge carrier electrochemical active compound or the whole solid-state battery device to a heat bath at a temperature greater than 600 degrees Celsius for a period of time, and cooling said charge carrier electrochemical active compound film or the whole solid-state battery device while maintaining a chamber pressure of about 100 Torr to about 150 Torr throughout said cooling step. Merely by way of example, lithium ion is the charge carrier of charge carrier electrochemical active compounds; $Li_{1.01}Ni_{0.34}Co_{0.33}Mn_{0.33}O_2$ or $Li_{1.01}Ni_{0.65}Co_{0.3}Al_{0.05}O_2$. To crystallize $Li_{1.01}Ni_{0.34}Co_{0.33}Mn_{0.33}O_2$ or $Li_{1.01}Ni_{0.65}Co_{0.3}Al_{0.05}O_2$ can be achieved by submerging $Li_{1.01}Ni_{0.34}Co_{0.33}Mn_{0.33}O_2$ or $Li_{1.01}Ni_{0.65}Co_{0.3}Al_{0.05}O_2$ film or the whole solid-state battery inside the oven or chamber. Next, providing process gas, such as oxygen, to the oven or chamber. Raising the temperature of the oven or chamber greater than 600 degrees Celsius for a period of time as a heat bath. After the heat batch, cooling $Li_{1.01}Ni_{0.34}Co_{0.33}Mn_{0.33}O_2$ or $Li_{1.01}Ni_{0.65}Co_{0.3}Al_{0.05}O_2$ film or the whole solid-state battery device while maintaining a chamber pressure of about 130 Torr throughout said cooling step.

A second approach of crystallizing electrochemically active film comprises exposing charge carrier electrochemical active compound film to pulsed broadcast photonic emission as the deposition process progress. The charge carrier electrochemical active compound film is a subset of the solid-state charge carrier electrochemical battery device. This type of annealing process includes the following steps: removing atmospheric gases from the chamber, providing process gas to the chamber, evaporating source material on to the substrate to form lithium electrochemical film, exposing lithium electrochemical cell film to pulsed broadcast photonic emission as the deposition progressing. The pulsed emission source can be selected from the group consisting of gamma rays, X-rays, ultraviolet, visible, infrared, microwaves, radio waves and combinations thereof. Merely by way of example, lithium ion is the charge carrier of charge carrier electrochemical active compounds: $Li_{1.01}Ni_{0.34}Co_{0.33}Mn_{0.33}O_2$ or $Li_{1.01}Ni_{0.65}Co_{0.3}Al_{0.05}O_2$. To crystallize $Li_{1.01}Ni_{0.34}Co_{0.33}Mn_{0.33}O_2$ or $Li_{1.01}Ni_{0.65}Co_{0.3}Al_{0.05}O_2$ can be achieved by exposing $Li_{1.01}Ni_{0.34}Co_{0.33}Mn_{0.33}O_2$ or $Li_{1.01}Ni_{0.65}Co_{0.3}Al_{0.05}O_2$ film to pulsed broadcast gamma rays emission as the deposition progressing.

In an embodiment, the present invention provides a list of material for detaching/smoothing/bounding layer, which can be Li, polymer or combinations thereof. The Li material can be used as bounding layer, because of its mechanical properties such as low modulus so that it could mitigate the residual stresses induced due to mismatch thermal expansion of new layer and existing layers during the deposition process, and high electrical conductivity so that it could reduce the electrical loss between the two electrode layers, especially between electrolyte and anode. On the other hand, polymer material can be used as detaching/smoothing/bounding layer, because of its material composition and its deposition process. Most of the polymer is a compound of carbon and hydrogen. Therefore, polymer film after burning would result in carbonized film. This carbonized polymer film could serve as detaching layer because it most likely is in pieces; therefore, the whole solid-state battery device can be separated into two parts from this carbonized polymer film. The deposition method for polymer layer comprises, a. Form resin of mixture of monomer/oligonmer, cure agent and releasing agent as source materials, wherein said monomer/oligonmer comprises, but not limited to, tripropylene glycol diacrylate, dipropylene glycol diacrylate, 1,6-Hexanediol diacrylate, trimethylolpropate triacrylate, trimethylolpropane trimethacrylate, and pentlaerythritol triacrylate; said cure agent comprises of visible light photo initiator, UV photo initiator, broad range photo initiator, IR poto initiator, and said releasing agent comprises of amorphous fluoropolymer, crytop, polydimethylsiloxane;

b. Form layer material by vacuum vapor deposition includes, but not limited to, spin coating, flash evaporation, or combinations thereof;

In an embodiment, the present invention provides a list of substrate materials, which comprises a substance selected from the group consisting of PET, polyester, plastics, polymers, resins, fabrics, non-woven fabrics, paper products, organic compounds, ceramics, composites, laminates, glass, silicon and combinations thereof.

In an embodiment, the present invention provide a method to terminate the polarities of the multilayered cells to conduct same polarity of electrodes into same side by termination methods including, but not limited to, laser ablation, selective etching, and mechanical masking.

In an embodiment, the present invention provides a method of manufacturing an electrochemical active layer within a solid-state battery device, where the electrochemical active layer comprises of either single-crystalline or amorphous ternary, quaternary or higher composition compound. The method comprising the steps: providing a first reactant on the first source and at least another reactants on another sources until all the required reactants on different sources, and then evaporate all reactants from all sources by means of controlling power through vacuum vapor deposition methods, or molecular beam epitaxial method to produce a predetermined ternary, quaternary or higher composition compound on a substrate or another electrochemical active layer. All of the reactants comprise of an oxygen compound or a non-oxygen compound.

In an embodiment, the present invention provides a method of how to synthesize the designed charge carrier electrochemical active compound film. The method includes selecting a first and another reactants, wherein a first and another reactants are selected either from the oxygen compound group of oxides of (either charge carrier, metal-1, metal-2, metal-3, metal-4, or combination thereof), from non-oxygen compound of (either charge carrier, metal-1, metal-2, metal-3, metal-4, or combination thereof), and pure elements of (either charge carrier, metal-1, metal-2, metal-3, metal-4, or combination thereof) in the form of powder, pellet, or target. The ratio of charge carrier to alloy of metal-1, metal-2, metal-3, and metal-4 is the same as the designed charge carrier electrochemical active compound layer. Merely by way of example metal-1, metal-2, metal-3 and metal-4 are consisting of Mn, Ni, Co, and Al, V. Also, the charge carrier are consisting of Li, Mg, and Na.

In an embodiment, the present invention provides a method of how to manufacturing design charge carrier electrochemical active compound film. After selecting the first and another reactants as mentioned in previous paragraph, all the reactants will be loaded into different sources depending on their vapor pressure and temperature relationship. If the reactants have similar vapor pressure at the similar temperature, they could be loaded into the same sources; otherwise, they should be loaded into different sources. Next, the reactants need to be evaporated from the sources, where the evaporation method includes vacuum vapor deposition, and molecular beam epitaxial method. Merely by way of example, these techniques include thermal evaporation, molten feed thermal evaporation, flash evaporation, e-beam vapor deposition, radio frequency magnetron sputtering, direct current magnetron sputtering, physical vapor deposition (PVD), chemical vapor deposition, low pressure chemical vapor deposition (LPCVD), atomic layer deposition (ALD), direct laser writing (DLW), sputtering, microwave plasma enhanced chemical vapor deposition (MPECVD), pulsed laser deposition (PLD), nanoimprint, ion implantation, laser ablation, spray deposition, spray pyrolysis, spray coating and plasma spraying.

In an embodiment, the present invention provides a method of manufacturing charge carrier electrochemical active oxide compound. The method include evaporating all reactants, where the reactants are selected from non-oxygen group, using vacuum vapor deposition methods or molecular beam epitaxial method, at the same time oxygen is provided as background gas, ion-gun plasma is provided, and controlling substrate temperature. By controlling the background gas pressure, power of the ion-gun plasma, and temperature of the substrate, the charge carrier electrochemical active oxide compound can be oxide of the single-crystalline or amorphous ternary, quaternary or higher composition compound layer within the solid-state battery device.

In an embodiment, the present invention provides a method of providing reactants to source. The method includes, but not limited to, heating the reactants over melting temperature or even over vaporization temperature so that the reactants are in the liquid or vapor phase when they become the sources for deposition, mixing reactants and proper solvent to dissolve reactant and heat the solution to more than 100° C. to remove water from the solution and delivered dehydrated solution as sources for evaporation.

In accordance with an aspect of the invention, a transportation system that is powered at least in part by electricity stored in the form of rechargeable electrochemical cells wherein those cells:

Achieve a specific volumetric energy density of at least 300 Wh/L and have a nominal capacity of at least 1 Ampere Hour Contain a cathode material consisting of a phosphate or oxide compound that is capable of achieving substantial lithium or magnesium intercalation Contain anode material consisting of a carbonaceous, silicon, tin, lithium metal or other material that is capable of plating or intercalating lithium or magnesium Contain a solid electrolyte that consists of a phosphate or a ceramic Are produced on a roll-to-roll production process Although Toyota and other have recently claimed to be working on solid state batteries none have been able to arrive at a design that is close to being capable of reaching the maturity needed for a product. For example, the batteries produced by Toyota recently were produced using a low-rate sputtering process with the same materials that have been used in conventionally-produced liquid-electrolyte lithium-ion batteries for over 15 years. The Toyota design was a 4" by 4" cell with positive and negative electrolytes where the active materials were lithium cobalt oxide and graphite, according to Nikkei Electronics.

Depending upon the specific embodiment, one or more of these benefits may be achieved. Of course, there can be other variations, modifications, and alternatives. The present invention achieves these benefits and others in the context of unique and non-intuitive process technology. However, a further understanding of the nature and advantages of the present invention may be realized by reference to the latter portions of the specification and attached drawings. It is also clear that embodiments of the invention must be optimized or changed for materials and layer thicknesses; however, the intrinsic invention and its purpose are conserved.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Thin film batteries have been known for some time. They exhibit the following characteristics:
a. low overall energy/capacity
b. limited applications
c. single layers
d. low volumetric energy density
e. low gravimetric energy density
f. very safe For items d and e, the overall specific energy and energy density can be much higher than lamination batteries by proper designing thin film battery as indicated in U.S. Pat. No. 7,945,344 issued May 17, 2011 and titled COMPUTATIONAL METHOD FOR DESIGN AND MANUFACTURE OF ELECTROCHEMICAL SYSTEMS. Unlike current thin film technology, it does not fully utilize it superiority of high specific energy and energy density over the lamination technologies. Lamination batteries by contrast, though, can provide moderate overall capacity and multiple layers, but its low safety factor, low cycle life, low overall volumetric energy density and low gravimetric energy density have make lamination batteries reaches their plateau on capable performance such as energy density, cycle life and safety. In order to break through lamination batteries' low specific energy and energy density, cycle life, and to combine thin film batteries' superiorities on those characteristics, this leads to winding of thin film batteries much as is done in lamination technologies.

It is desired for lithium battery in discharged state, because the active materials are in a stable state. Hence, it is suitable for storage and shipping. In lamination batteries, the cathode is in discharged state because of the way cathode active materials are produced. On the other hand, it can easily attune to either in charged or in discharged state for thin film battery due to the versatile of vapor deposition techniques. Also, vapor deposition techniques provide much economic and environmental benign approach to manufacturing electrode components since it can be produced from the raw materials instead of going through extra energetic approaches to form desired stoichiometry of active materials. Accordingly, it is seen that there exists a need for method to produce high energy density multilayered solid-state battery with crystalline structure in active materials.

Furthermore, most high energy density cathode material in battery technologies, especially in lithium battery technology, requires the active material in crystalline structure. In lamination batteries, the crystalline structure of cathode and anode is achieved by heat treatment during the formation of active particles. However, it becomes difficult for solid-state battery because active material film undergoes phase change and the desired crystalline structure is not formed during the deposition for some vapor deposition techniques. In order to achieve desired crystalline structure, the extra in-situ steps, other than the film deposition steps, are required to provide heat to the film to induce phase change to desired crystalline structure.

Figure 1A:
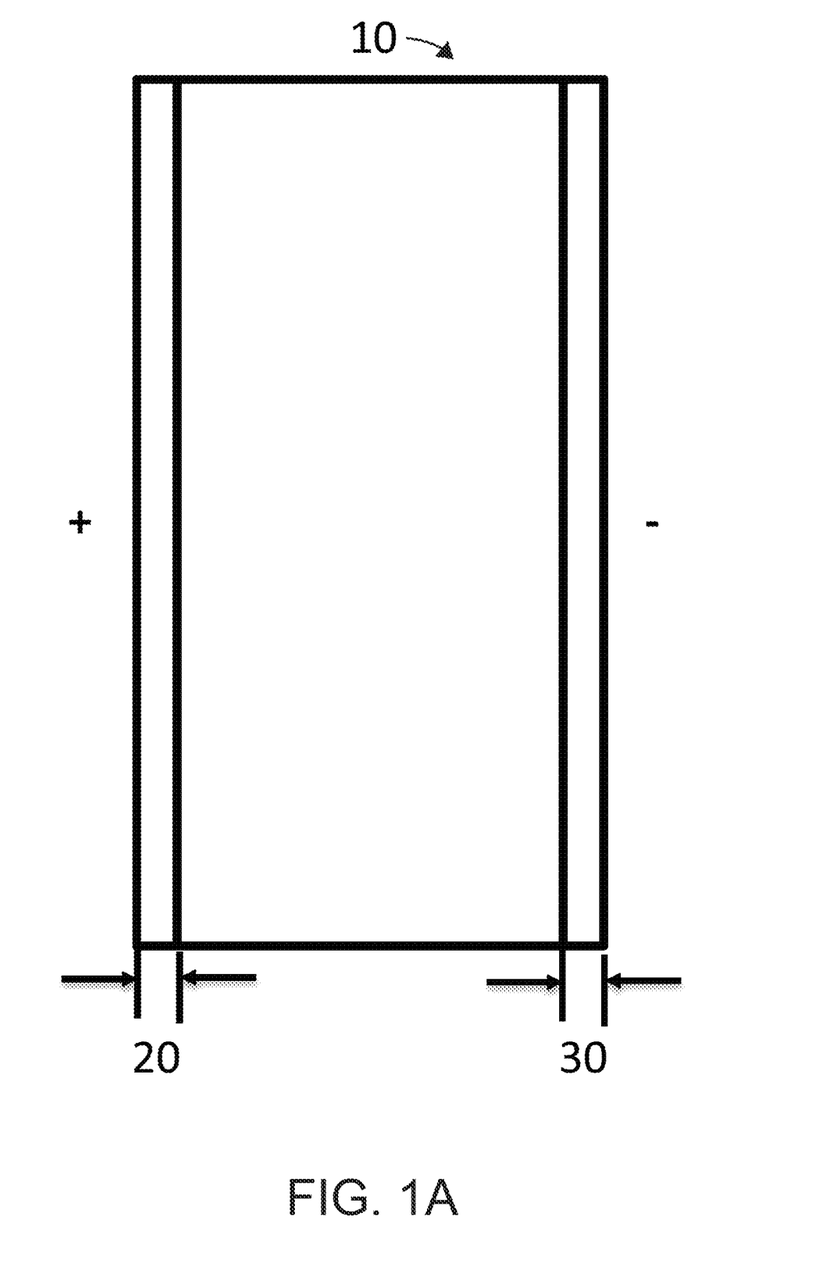
FIG. 1A is a simplified top view of a multi-layered solid state cell according to an embodiment of the present invention.

Example 1: Optimization of Battery Terminations in Edge of the High Energy Density Solid State Battery FIG. 1A is a simplified top view of a multi-layered solid state cell according to an embodiment of the present invention. FIG. 1A illustrates the definition of the t1, which is the distance from the side of the battery to the ablated edge of the electrode, such as 20 and 30. The 10 is the top view of the multi-stack of solid state thin film cell.

Figure 1B:
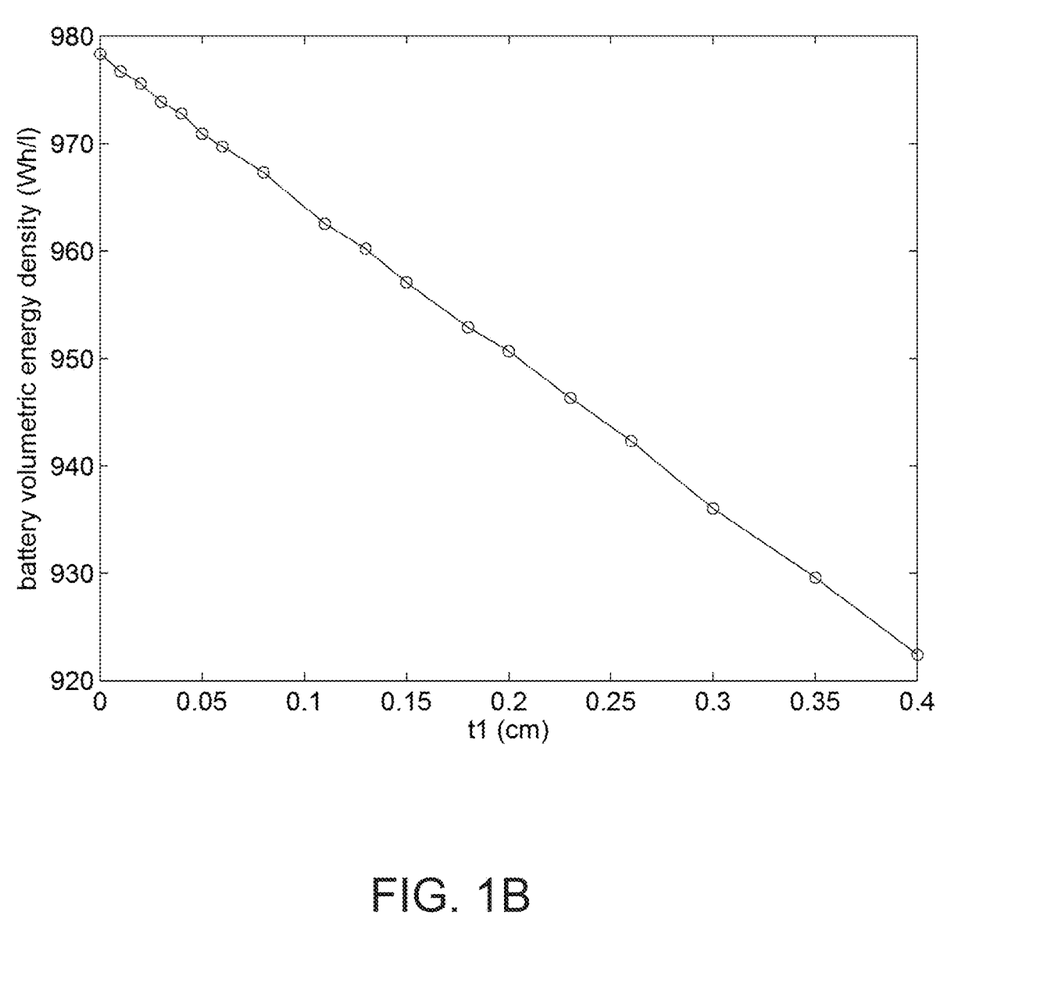
FIG. 1B is a graph of the relationship between battery volumetric energy density and a thickness t1 (cm) of a multi-layered solid state cell according to an embodiment of the present invention.

FIG. 1B is a graph of the relationship between battery volumetric energy density and a thickness t1 (cm) of a multi-layered solid state cell according to an embodiment of the present invention. FIG. 1B demonstrates the effect of the length edge of high energy density, which is denoted as t1 in this example. As the length, t1, increased from 0 to 0.4 cm, the energy density of the battery decreased from about 980 Wh/L to about 920 Wh/L. It clearly illustrated the importance the controlling t1 in order to achieve high energy density of battery. This example illustrates by utilizing the laser ablation to remove electrode material to expose proper polarity of the electrode to one side and the opposite polarity of the electrode would be exposed to the other side the battery.

Figure 2A:
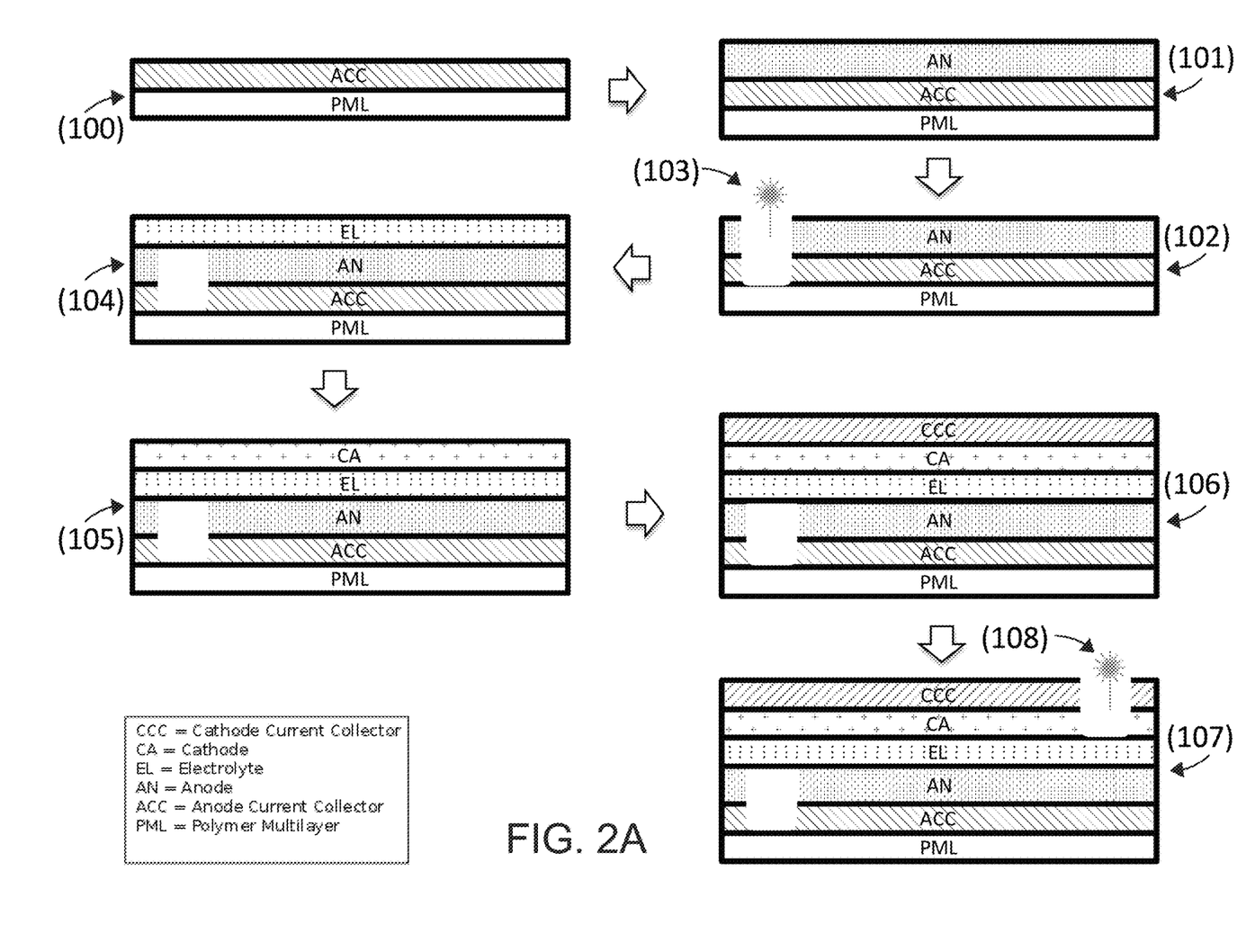
FIG. 2A is a simplified flow diagram for a method for fabricating a multi-layer solid state rechargeable battery according to an embodiment of the present invention.
Figure 2B:
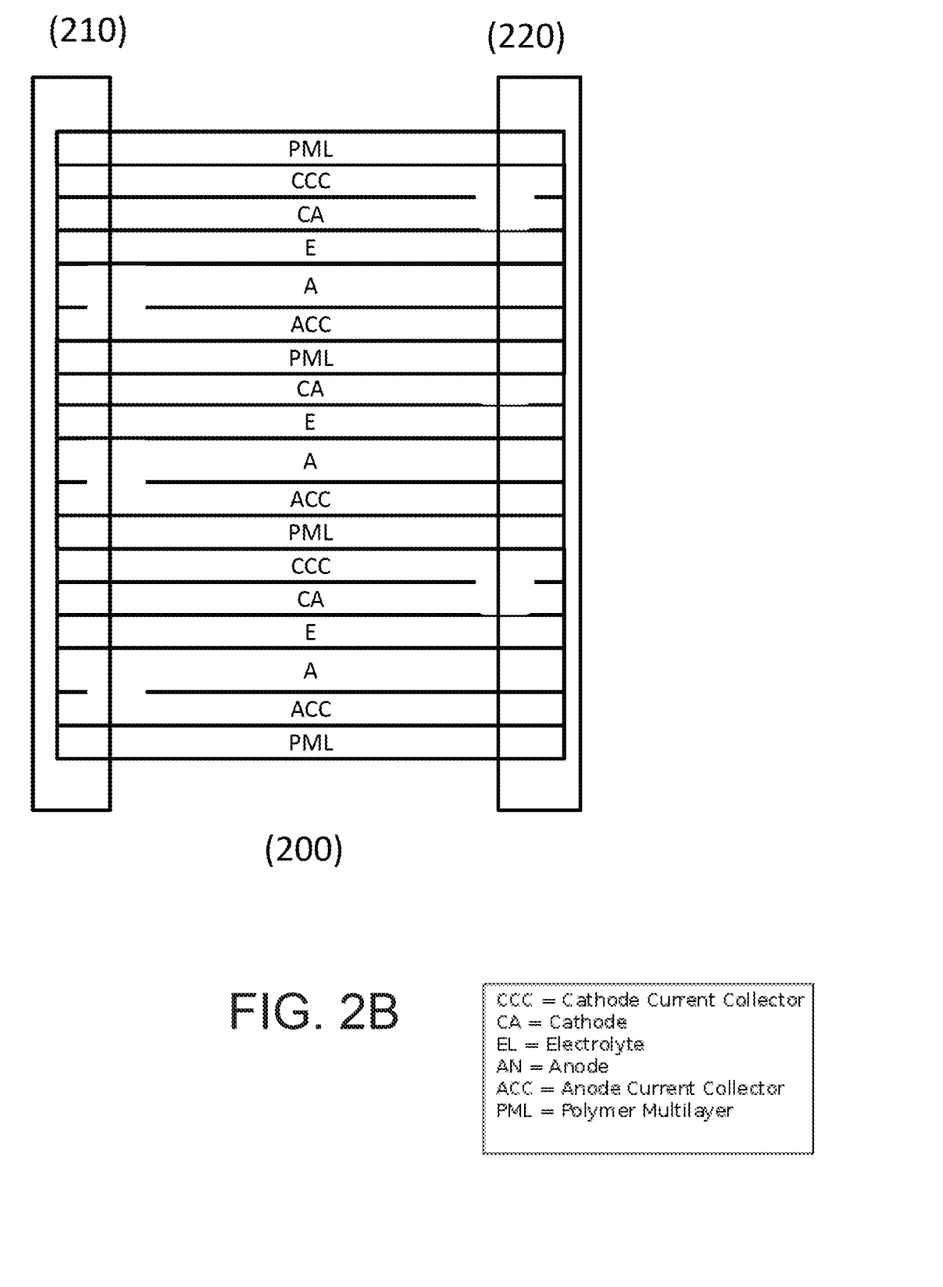
FIG. 2B is a simplified cross-sectional diagram illustrating a method step for fabricating a multi-layer solid state battery according to an embodiment of the present invention.
Figure 2C:
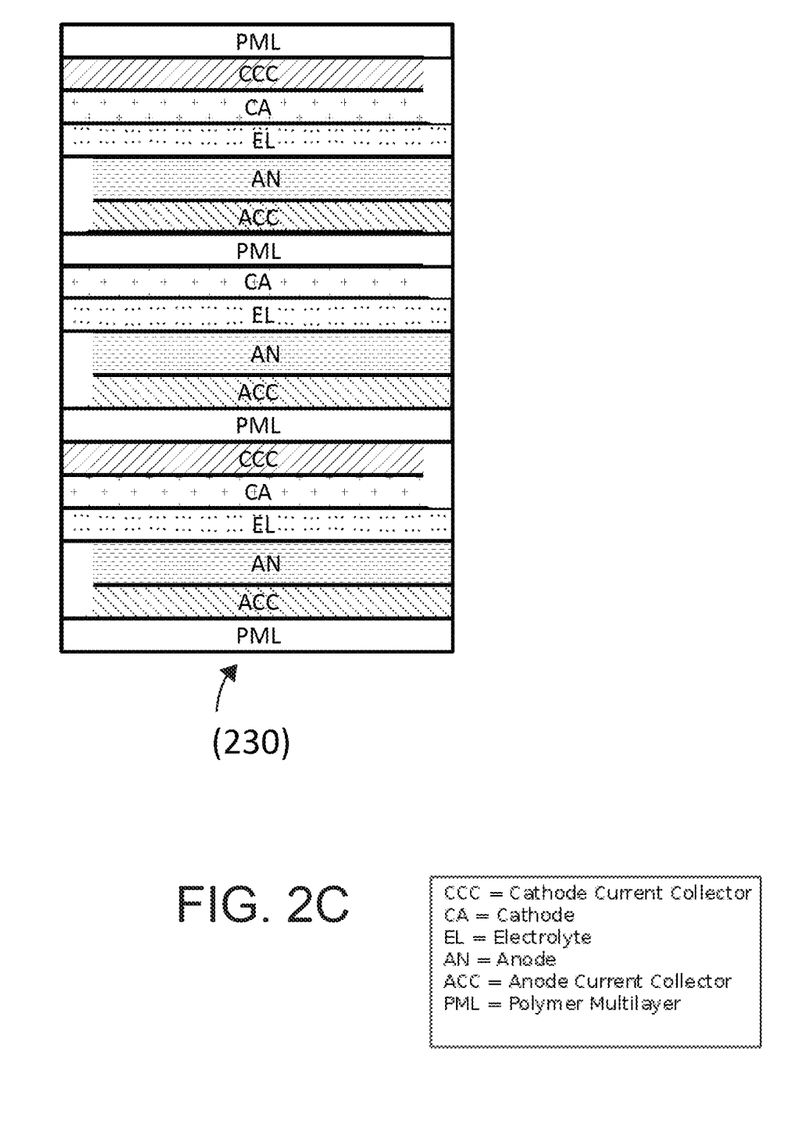
FIG. 2C is a simplified cross-sectional diagram illustrating a method step for fabricating a multi-layer solid state battery according to an embodiment of the present invention.

FIGS. 2A-2C illustrate the steps of utilizing a laser to ablate cell components to expose two opposite polarities to two different sides of the multi-stack cells. In each of these figures, a key with the abbreviations for each of the layers is explained. FIG. 2A is a simplified flow diagram for a method for fabricating a multi-layer solid state rechargeable battery according to an embodiment of the present invention. In FIG. 2A, the steps involved in the fabrication of a single cell are illustrated. In step 100, the anode current collector is deposited on top of PML. In step 101, the anode is deposited on the device of 100. Then, the laser, 103, is employed to ablate left hand side to anode and anode current collector to insulate the negative polarity by depositing electrolyte, as shown in step 104. Then the cathode and cathode current collector are deposited on top of the electrolyte as shown in step 105 and step 106. Then the laser 108 is utilized to ablate out part of the cathode and cathode current collector close to right hand side.

FIGS. 2B and 2C are simplified cross-sectional diagrams illustrating a method step for fabricating a multi-layer solid state battery according to an embodiment of the present invention. Next, the whole process just described in this example will be repeated to form upper layer to form multi-stack cells as a battery (200). Finally, the zones in the rectangle dashed boxes (210, 220) will be removed by laser or chemical etching to expose positive polarity electrode on the left hand side of the multi-stack cells, and the negative polarity electrode on the right hand side of the multi-stack cells as shown in (230) of FIG. 2C.

Figure 3A:
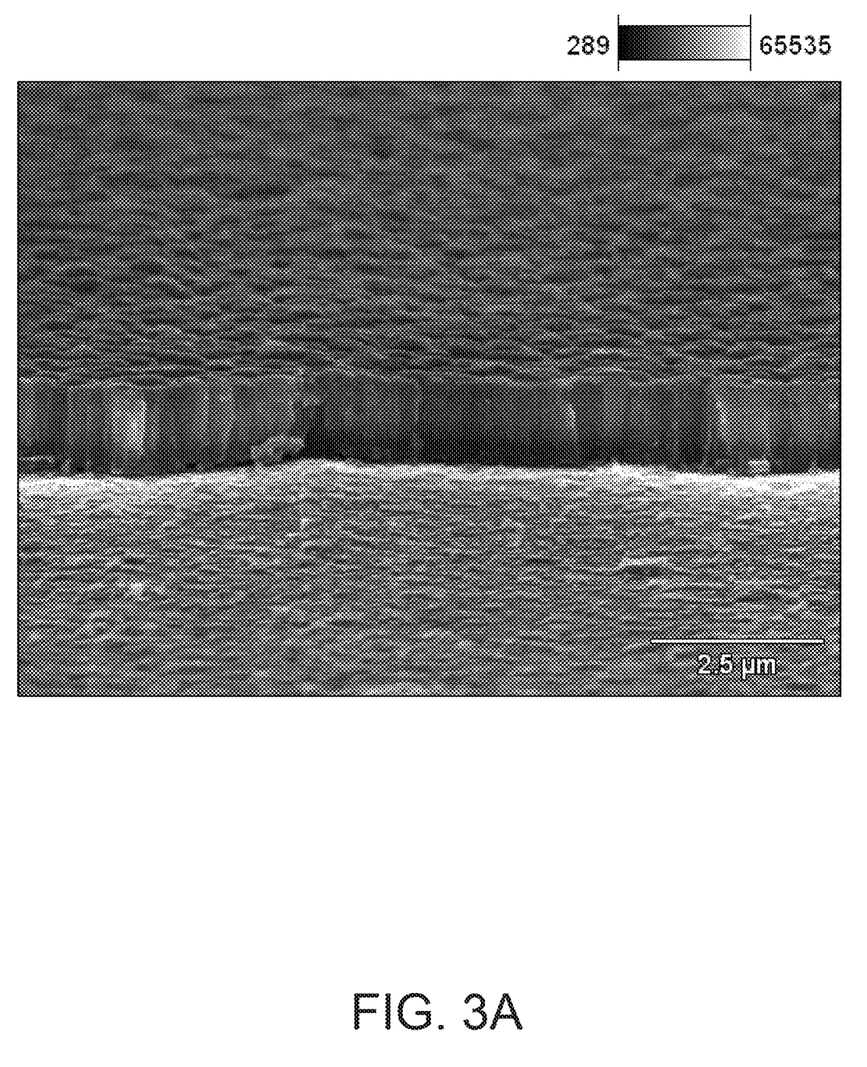
FIGS. 3A and 3B are scanning electron microscope images of thin film material according to embodiments of the present invention.
Figure 3B:
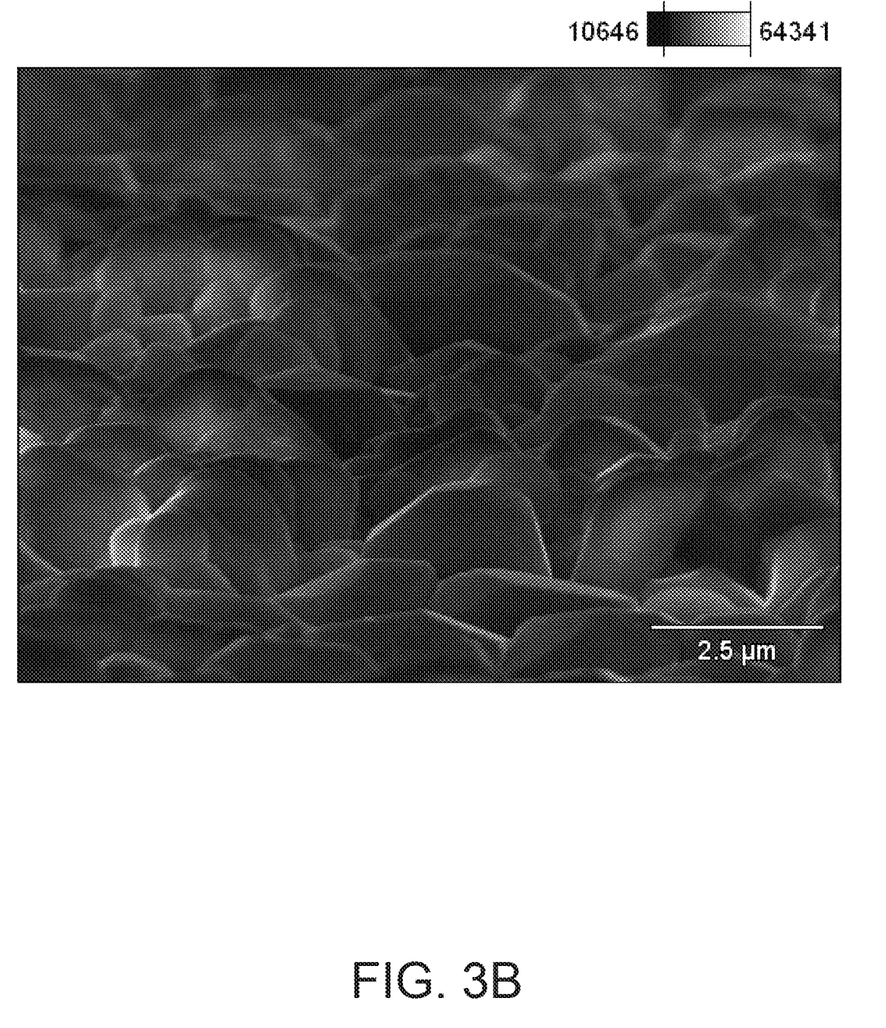

FIGS. 3A and 3B are scanning electron microscope images of thin film material according to embodiments of the present invention. FIG. 3A is a scanning electron microscope image of a $LiNi_{1/3}Co_{1/3}Mn_{1/3}O_2$ film as it was deposited. FIG. 3B is a scanning electron microscope image of a $LiNi_{1/3}Co_{1/3}Mn_{1/3}O_2$ film as it was annealed at 800° C. for 2 hours. These images provided further detail to the method embodiments described previously.

In an embodiment, the present invention provides a method of producing a monolithically integrated high energy density solid-state battery device. This method can involve a discharge configuration having a method for depositing a discharged battery cell (i.e. addition of Li to the cathode material). The method can include the following:

Position a substrate to provide a foundation for one or more stacked monolithically integrated solid-state electrochemical cells;

Depositing one or more high energy density solid-state electrochemical cells in series or in parallel configurations sequentially or individually; wherein each of the high energy density solid-state electrochemical cell having, a first barrier layer, an electrically conductive layer configured as a cathode current collector deposited overlying the first barrier layer, an amorphous or crystalline charge carrier intercalated metal-1, metal-2, and metal-3 oxide or phosphate compound serving as cathode overlying the electrically conductive layer, a glassy electrolyte material configured as an electrolyte overlying the cathode electrode material, a solid state layer of negative electrode material configured as an anode capable of electrochemical insertion or plating of ions during a charge process and a discharge process, an electrically conductive layer configured as an anode current collector deposited overlying the solid state layer of negative electrode material, and a second barrier layer to provide better attachment and prevent oxidation of negative electrode material;

Rapidly heating the one or more stacked monolithically integrated high energy density solid-state electrochemical cells to a target temperature for at least 60 minutes.

Connecting one or more stacked monolithically integrated solid-state electrochemical cells electrically in series or in parallel configured by termination methods including but not limited to laser ablation, selective etching, and mechanical masking to form a monolithically integrated high energy density solid-state battery device.

In an embodiment, the present invention can include a method of depositing each layer of high energy density solid-state electrochemical cell, that includes but is not limited to, thermal evaporation, phase-change liquid feeder assisted thermal evaporation, e-beam vapor deposition, radio frequency magnetron sputtering, direct current magnetron sputtering, physical vapor deposition (PVD), chemical vapor deposition, low pressure chemical vapor deposition (LPCVD), atomic layer deposition (ALD), direct laser writing (DLW), sputtering, microwave plasma enhanced chemical vapor deposition (MPECVD), pulsed laser deposition (PLD), nanoimprint, ion implantation, laser ablation, spray deposition, spray pyrolysis, spray coating and plasma spraying.

In an embodiment, the present invention can include a method of depositing charge carrier intercalated in metal-1, metal-2 and metal-3 oxide or phosphate layer, that includes evaporating charge carrier metal, and/or charge carrier compound from one evaporation source, and evaporating metal-1, metal-2, and metal-3 precursors from another evaporation source or from three different evaporation sources, where in the relative amounts of charge carrier or/and charge carrier related compound, metal-1, metal-2 and metal-3 precursors are controlled by the evaporation speeds and additional oxidation sources including but not limited to background oxygen, ion beam sources, and plasma sources to yield desired stoichiometry of the resulting oxide or phosphate of lithium metal-1, metal-2, and metal-3 layers, wherein the evaporation method includes, but not limited to, a. physical vapor deposition (PVD) by thermal means, such as by e-beam heating, by resistance heating, by induction heating, by ion beam heating, by laser ablation, by pulsed laser deposition (PLD), by molecular beam epitaxy, by Ion Beam Assisted Deposition (IBAD), by close coupled sublimation, by gas cluster ion beam, all with or without bias and their combinations;

b. another physical vapor deposition (PVD) by momentum transfer, such as by diode sputtering, by magnetron sputtering, by unbalanced magnetron sputtering, by high power impulse magnetron sputtering, by RF sputtering, by DC sputtering, by MF sputtering, by cylindrical sputtering, by hollow cathode sputtering, by sputter evaporation, by ion beam sputtering, by sputter ion cluster, by bias sputtering, by cathodic arc, by filtered cathodic arc, and their combinations;

c. physical deposition (PD) by direct material transfer, such as by metal powder spraying, by plasma spraying, by arc spraying, by flame spraying, by rod flame (Rokide) spraying, by autocatalytic spraying;

d. reactive PVD by background gas, by ion beam assisted deposition (IBAD), by plasma activated PVD, and by their combinations;

e. chemical vapor deposition (CVD) by upstream plasma activation, by down stream plasma activation, by thermal activation, by laser induced activation, by UV activation, by ion activation, by electron beam activation, by catalytic activation, by gas phase activation and by their combinations, f. or reactive CVD by background gas, by ion beam assisted deposition (IBAD), by plasma activated CVD, and by their combinations; Atomic Layer Deposition (ALD) by sequentially pumping and filling a chamber, by sequential chambers of vacuum and vapor, by adding thermal energy, by adding ion beam energy, by adding laser energy, by adding UV energy and by their combinations, wherein the source materials of film can be transported to the evaporation source either by belt feeder, screw feeder, wire feeder, cartridge feeder, rod feeder, pellet feeder, liquid phase feeder, phase change feeder, or reservoir feeder.

In an embodiment, the present invention includes a method of depositing charge carrier intercalated metal-1, metal-2 and metal-3 oxide or phosphate layer in, that includes evaporating compounds of charge carrier metal-1, metal-2, and metal-3 precursors from at least two evaporation source depending on the compatibility of vaporization (melting) temperatures of each charge carrier metal compounds under vacuum environment. In a specific embodiment, metal-1, metal-2, and metal-3 are selected from the Groups 5 7, 8, 9, 10, and 13 of periodic table, which consisting of Fe, Al, V, Mn, Co, Ni or combinations thereof;

In an embodiment, the present invention includes a method, wherein the charge carrier are, but not limited to, lithium, magnesium, sodium, lanthanum and other metal from Group 1 or 2 of periodic table, and their compounds include, but are not limited to, charge carrier of oxide, of peroxide, of superoxide, of acetate, of carbonate, of carbide, of citrate, of aluminate, of amide, of azide, of beryllide, of borate, of hydride, of hydroxide, of imide, of cobalt oxide, of diisopropylamide, of fluoride, of hexafluorophosphate, of hypochlorite, of iodide, of copper phosphate, of aluminum phosphate, of metaborate, of molybdate, of niobate, of nitrate, of nitride, of nitrite, of orotate, of perchlorate, of stearate, of succinate, of sulfate, of sulfide, of sulfite, of tantalite, of tetrachloroaluminate, of tetrafluoroborate, of tetrakis(pentafluorophenyl)borate, of tetramethylpiperidide, of titanate, of triborate, of triethylborohydride, of tungstate or combinations thereof.

In an embodiment, the present invention can include a method of producing a monolithically integrated high energy density solid-state battery device. This method can involve a smoothing layer, which includes a method for smoothing of a layer (addition of PML or Li) to reduce defects due to crystallinity. In various embodiments, the method can include pyrolysis of a smoothing layer to form a conductive carbon layer in the cell and the battery device can use Li or any other active material such as Mg and the like. These and other extra steps other than steps that are required for solid-state electrochemically active layers can be included. The said extra steps can include, but not limited to the following:

To crystallize said electrochemically active layers while heat is induced inside electrochemical battery device;

To deposit layer material between two electrochemically active layers wherein layer material serves as detaching layers, smoothing layers, or bounding interface between two electrochemically active layers to form monolithically integrated high energy density solid-state electrochemical cells configured by termination methods including but not limited to laser ablation, selective etching, and mechanical masking;

To carbonize said layer material between electrochemically active layers with raising layer material temperature to decompose it and at the same time controlling environmental air condition to form desired carbonized layer to serve as conductive layer or detaching layer;

To terminate the polarities of the multilayered cells to conduct same polarity of electrodes into same side by termination methods including, but not limited to, laser ablation, selective etching, and mechanical masking.

In an embodiment, the method of depositing layer material between two electrochemically active layers in a monolithically integrated high energy density solid-state battery device can be configured by termination methods including but not limited to laser ablation, selective etching, and mechanical masking, wherein the layer materials include, but not limited to, Li, polymer or combinations thereof.

In an embodiment, the method of depositing layer materials, said layer material comprises of polymer, between electrochemically active layer in a monolithically integrated high energy density solid-state electrochemical battery device, said method includes the following steps, but is not limited to,
  a. Form resin of mixture of monomer/oligonmer, cure agent and releasing agent as source materials, wherein said monomer/oligonmer comprises, but not limited to, tripropylene glycol diacrylate, dipropylene glycol diacrylate, 1,6-Hexanediol diacrylate, trimethylolpropate triacrylate, trimethylolpropane trimethacrylate, and pentlaerythritol triacrylate; said cure agent comprises of visible light photo initiator, UV photo initiator, broad range photo initiator, IR poto initiator, and said releasing agent comprises of amorphous fluoropolymer, crytop, polydimethylsiloxane;
  b. Form layer material by vacuum vapor deposition includes, but not limited to, spin coating, flash evaporation, or combinations thereof;

In an embodiment, the method of depositing film materials as smoothing layer, said film material comprises of charge carrier metal, between electrochemically active layer in a monolithically integrated high energy density solid-state lithium electrochemical battery device, includes the following, but is not limited to,
  a. physical vapor deposition (PVD) by thermal means, such as by e-beam heating, by resistance heating, by induction heating, by ion beam heating, by laser ablation, by pulsed laser deposition (PLD), by molecular beam epitaxy, by Ion Beam Assisted Deposition (IBAD), by close coupled sublimation, by gas cluster ion beam, all with or without bias and their combinations;
  b. another physical vapor deposition (PVD) by momentum transfer, such as by diode sputtering, by magnetron sputtering, by unbalanced magnetron sputtering, by high power impulse magnetron sputtering, by RF sputtering, by DC sputtering, by MF sputtering, by cylindrical sputtering, by hollow cathode sputtering, by sputter evaporation, by ion beam sputtering, by sputter ion cluster, by bias sputtering, by cathodic arc, by filtered cathodic arc, and their combinations;
  c. physical deposition (PD) by direct material transfer, such as by metal powder spraying, by plasma spraying, by arc spraying, by flame spraying, by rod flame (Rokide) spraying, by autocatalytic spraying;
  d. reactive PVD by background gas, by ion beam assisted deposition (IBAD), by plasma activated PVD, and by their combinations;
  e. chemical vapor deposition (CVD) by upstream plasma activation, by down stream plasma activation, by thermal activation, by laser induced activation, by UV activation, by ion activation, by electron beam activation, by catalytic activation, by gas phase activation and by their combinations,
  f. or reactive CVD by background gas, by ion beam assisted deposition (IBAD), by plasma activated CVD, and by their combinations; Atomic Layer Deposition (ALD) by sequentially pumping and filling a chamber, by sequential chambers of vacuum and vapor, by adding thermal energy, by adding ion beam energy, by adding laser energy, by adding UV energy and by their combinations,
wherein the source materials of film can be transported to the evaporation source either by belt feeder, screw feeder, wire feeder, cartridge feeder, rod feeder, pellet feeder, liquid phase feeder, phase change feeder, or reservoir feeder.

In an embodiment, the method of crystallizing electrochemically active layers includes but is not limited to, annealing charge carrier electrochemical active compound, said charge carrier electrochemical active compound is a subset of the high energy density solid-state electrochemical battery device or the whole, wherein annealing steps include position the lithium electrochemical cell component in a chamber, removing atmospheric gases from the chamber, providing process gas to the chamber; submerging charge carrier electrochemical active compound to heat bath at a temperature greater than 600 degrees Celsius; and cooling said charge carrier electrochemical active compound while maintaining a chamber pressure of about 100 Torr to about 150 Torr throughout said cooling.

In an embodiment, the method of crystallizing electrochemically active films can include, but is not limited to, annealing charge carrier electrochemical active compound film, said charge carrier electrochemical active compound film is a subset of the solid-state battery device, wherein annealing steps include removing atmospheric gases from the chamber, providing process gas to the chamber, evaporating source material on to the substrate to form charge carrier electrochemical active compound films, exposing charge carrier electrochemical active compound film to pulsed broadcast photonic emission as the deposition progressing; In an embodiment, the pulsed emission comprises an emission selected from the group consisting of gamma rays, X-rays, ultraviolet, visible, infrared, microwaves, radio waves and combinations thereof.

In an embodiment, the present invention can include a method of manufacturing a designed charge carrier electrochemical active compound layer within a solid-state battery device said electrochemical active layer includes either single-crystalline or amorphous ternary, quaternary or higher composition compound. This method can involve the processing of materials in homogenous or alloyed targets. The method includes use of materials in sources comprised of pure material alloys rather than powders that are reprocessed. The steps can be as follows:

Providing a first reactant on a first source, wherein a first reactant comprises of an oxygen compound or a non-oxygen compound;

providing at least another reactants on another sources until all the required reactants on different sources, wherein another reactants comprise of oxygen compounds or a non-oxygen compound;

evaporate all reactants from all sources by means of controlling power through vacuum deposition methods, or molecular beam epitaxial method to produce a predetermined ternary, quaternary or higher composition compound on a substrate or another electrochemical active layer.

In an embodiment, regarding the method of providing a first and another reactants, a first and another reactants can be selected from either the oxygen compound group of oxides of (either charge carrier, metal-1, metal-2, metal-3, metal-4, or combination thereof), non-oxygen compound group of alloys of (either charge carrier, metal-1, metal-2, metal-3, metal-4, or combination thereof), and group of pure (either charge carrier, metal-1, metal-2, metal-3, metal-4, or combination thereof) in the form of powder, pellet, or target, wherein the molar ratio of charge carrier:(metal-1, metal-2, metal-3, metal-4) is the same as designed charge carrier electrochemical active compound layer, said metal-1, metal-2, metal-3 and metal-4 are consisting of Al, V, Mn, Co, Ni; and said charge carrier is consisting of either Li, Mg, or Na.

In an embodiment, the method of depositing designed charge carrier electrochemical active compound layer can include wherein the designed charge carrier electrochemical active compound includes, but is not limited to, $Li_{1.01}Ni_xMn_yCo_{1-x-y}O_2$ and $Li_{1.01}Ni_xCo_yAl_{1-x-y}O_2$ where x+y is less than one and x and y is greater than zero, $Li_{1.01}Ni_xCo_yAl_zMn_{1-x-y-z}O_2$ where x+y+z is less than one and x, y, z are greater than zero, and $Li_xV_2O_5$ where x is between zero and three.

In an embodiment, the method of vacuum vapor deposition or molecular beam epitaxial method can include but is not limited to, a. physical vapor deposition (PVD) by thermal means, such as by e-beam heating, by resistance heating, by induction heating, by ion beam heating, by laser ablation, by pulsed laser deposition (PLD), by molecular beam epitaxy, by Ion Beam Assisted Deposition (IBAD), by close coupled sublimation, by gas cluster ion beam, all with or without bias and their combinations;

b. another physical vapor deposition (PVD) by momentum transfer, such as by diode sputtering, by magnetron sputtering, by unbalanced magnetron sputtering, by high power impulse magnetron sputtering, by RF sputtering, by DC sputtering, by MF sputtering, by cylindrical sputtering, by hollow cathode sputtering, by sputter evaporation, by ion beam sputtering, by sputter ion cluster, by bias sputtering, by cathodic arc, by filtered cathodic arc, and their combinations;

c. physical deposition (PD) by direct material transfer, such as by metal powder spraying, by plasma spraying, by arc spraying, by flame spraying, by rod flame (Rokide) spraying, by autocatalytic spraying;

d. reactive PVD by background gas, by ion beam assisted deposition (IBAD), by plasma activated PVD, and by their combinations;

e. chemical vapor deposition (CVD) by upstream plasma activation, by down stream plasma activation, by thermal activation, by laser induced activation, by UV activation, by ion activation, by electron beam activation, by catalytic activation, by gas phase activation and by their combinations, or f. reactive CVD by background gas, by ion beam assisted deposition (IBAD), by plasma activated CVD, and by their combinations; Atomic Layer Deposition (ALD) by sequentially pumping and filling a chamber, by sequential chambers of vacuum and vapor, by adding thermal energy, by adding ion beam energy, by adding laser energy, by adding UV energy and by their combinations, wherein the source materials of film can be transported to the evaporation source either by belt feeder, screw feeder, wire feeder, cartridge feeder, rod feeder, pellet feeder, liquid phase feeder, phase change feeder, or reservoir feeder.

In an embodiment, the method of evaporating all reactants from sources, wherein the reactants are selected from non-oxygen group, the method comprised of using vacuum vapor deposition methods, but also needs to contain oxygen as background gas with using ion-beam assisted or by controlling substrate temperature to form oxide of the single-crystalline or amorphous ternary, quaternary or higher composition compound layer within the solid-state battery device.

In an embodiment, the method of providing reactants to source, wherein the transportation method includes, but is not limited to, either by belt feeder, screw feeder, wire feeder, cartridge feeder, rod feeder, pellet feeder, liquid phase feeder, phase change feeder, or reservoir feeder It is also understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A method of producing a monolithically integrated high energy density solid-state battery device, the method comprising:

forming a plurality of stacked monolithically integrated high energy density solid-state electrochemical cells sequentially or individually on a substrate in one or more deposition chambers, each monolithically integrated high energy density solid-state electrochemical cell of the plurality of stacked monolithically integrated high energy density solid-state electrochemical cells comprising:

a first barrier layer, a cathode current collector formed over the first barrier layer, a cathode layer comprising an amorphous or crystalline charge carrier intercalated metal-1, metal-2, and metal-3 oxide or phosphate compound formed over the cathode current collector, a solid state anode layer configured for electrochemical insertion or ions plating during a charge process and a discharge process, an anode current collector formed over the solid state anode layer, and a second barrier layer configured to prevent oxidation of the solid state anode layer;

annealing the plurality of stacked monolithically integrated high energy density solid-state electrochemical cells to a target temperature of greater than 600° C. for at least 60 minutes; and connecting the plurality of stacked monolithically integrated high energy density solid-state electrochemical cells electrically in series or in parallel, wherein the plurality of stacked monolithically integrated high energy density solid-state electrochemical cells are terminated using one of laser ablation, selective etching, or mechanical masking to form a monolithically integrated high energy density solid-state battery device.

2. The method of claim 1, wherein forming the one or more stacked monolithically integrated high energy density solid-state electrochemical cells comprises a process selected from the group consisting of thermal evaporation, phase-change liquid feeder assisted thermal evaporation, e-beam vapor deposition, radio frequency magnetron sputtering, direct current magnetron sputtering, physical vapor deposition (PVD), chemical vapor deposition, low pressure chemical vapor deposition (LPCVD), atomic layer deposition (ALD), direct laser writing (DLW), microwave plasma enhanced chemical vapor deposition (MPECVD), pulsed laser deposition (PLD), nanoimprint, ion implantation, laser ablation, spray deposition, spray pyrolysis, spray coating, and plasma spraying.

3. The method of claim 1, wherein forming the charge carrier intercalated metal-1, metal-2, and metal-3 oxide or phosphate compound comprises an evaporation method configured to evaporate a charge carrier metal or charge carrier compound from an evaporation source, and to evaporate metal-1, metal-2, and metal-3 precursors from another evaporation source or three different evaporation sources controlled by evaporation speeds and oxidation sources including background oxygen, ion beam sources, or plasma sources, wherein the evaporation method is selected from the group consisting of physical vapor deposition (PVD) by thermal techniques, PVD by momentum transfer, physical deposition (PD) by direct material transfer, reactive PVD by background gas, chemical vapor deposition (CVD), or reactive CVD by background gas, wherein the evaporation sources are configured to receive source materials via a device selected from the group consisting of a belt feeder, a screw feeder, a wire feeder, a cartridge feeder, a rod feeder, a pellet feeder, a liquid phase feeder, a phase change feeder, and a reservoir feeder.

4. The method of claim 3, wherein the charge carrier intercalated metal-1, metal-2, and metal-3 oxide or phosphate compound is formed using vapor transport deposition, and comprises providing continuous powder feeds of the charge carrier intercalated metal-1, metal-2, and metal-3 oxide or phosphate compound into the evaporation sources.

5. The method of claim 4, wherein a rate of delivery of the powder feeds into the evaporation sources is linked to a vapor temperature of the one or more chambers and a temperature of the substrate.

6. The method of claim 1, wherein forming the charge carrier intercalated metal-1, metal-2, and metal-3 oxide or phosphate compound comprises evaporating compounds of charge carrier metal-1, metal-2, and metal-3 precursors from at least two evaporations sources under vacuum environment.

7. The method of claim 1, wherein metal-1, metal-2, and metal-3 are materials selected from the group consisting of Group 5, Group 7, Group 8, Group 9, Group 10, and Group 13 of the periodic table.

8. The method of claim 1, wherein the charge carrier comprises at least one of lanthanum or a metal from Group 1 or 2 of the periodic table, and wherein the charge carrier intercalated metal-1, metal-2, and metal-3 oxide or phosphate compound comprises a charge carrier selected from the group consisting of oxide, peroxide, superoxide, acetate, carbonate, carbide, citrate, aluminate, amide, azide, beryllide, borate, hydride, hydroxide, imide, cobalt oxide, diisopropylamide, fluoride, hexafluorophosphate, hypochlorite, iodide, copper phosphate, aluminum phosphate, metaborate, molybdate, niobate, nitrate, nitride, nitrite, orotate, perchlorate, stearate, succinate, sulfate, sulfide, sulfite, tantalite, tetrachloroaluminate, tetrafluoroborate, tetrakis(pentafluorophenyl)borate, tetramethylpiperidide, titanate, triborate, triethylborohydride, and tungstate.

* * * * *